No. 837,605. PATENTED DEC. 4, 1906.
J. M. CARNCROSS.
BOX MAKING MACHINE.
APPLICATION FILED DEC. 12, 1904. RENEWED JUNE 27, 1906.

11 SHEETS—SHEET 6.

WITNESSES

INVENTOR
J. M. Carncross.
BY
Franklin H. Hough
Attorney

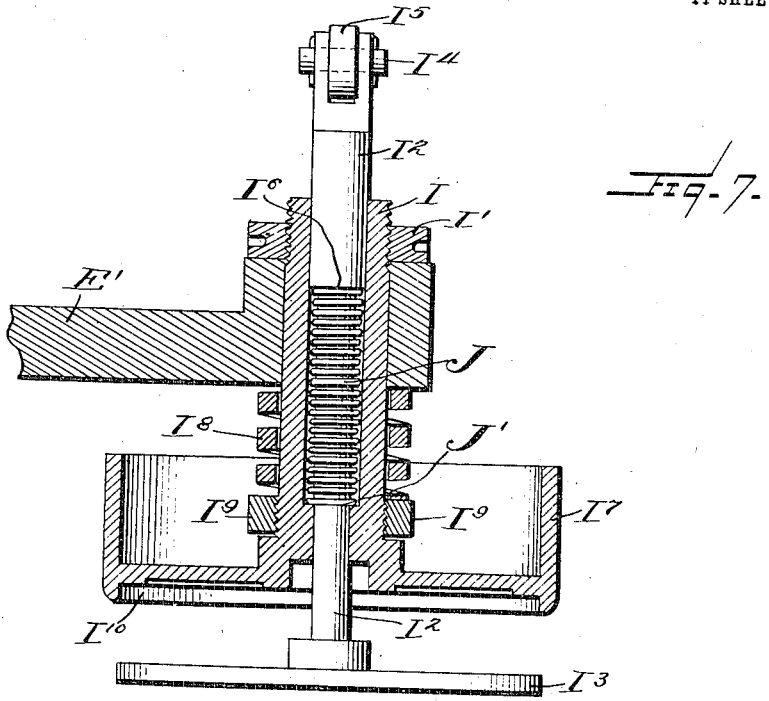
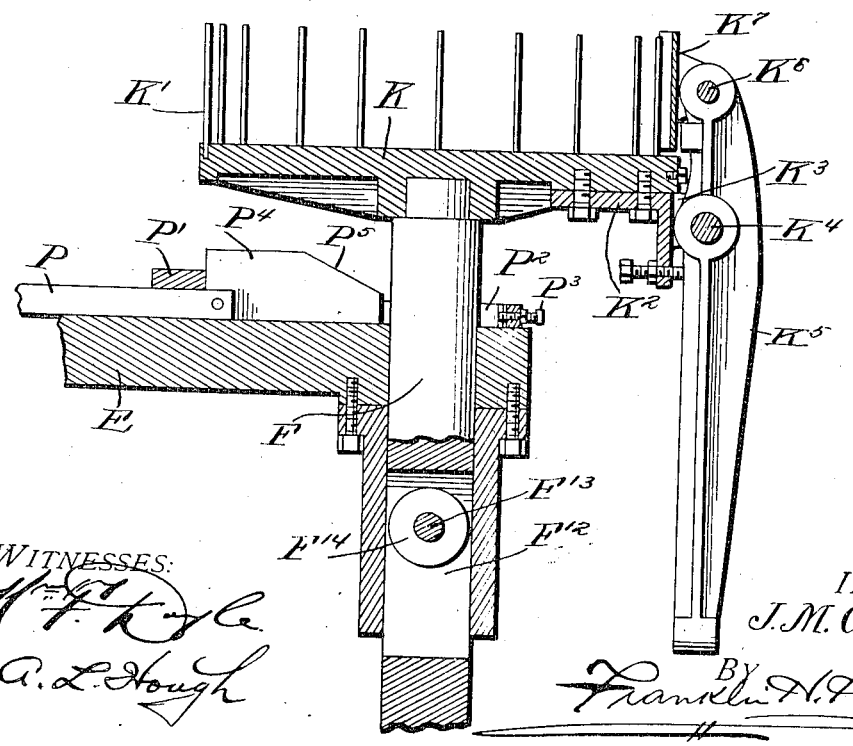

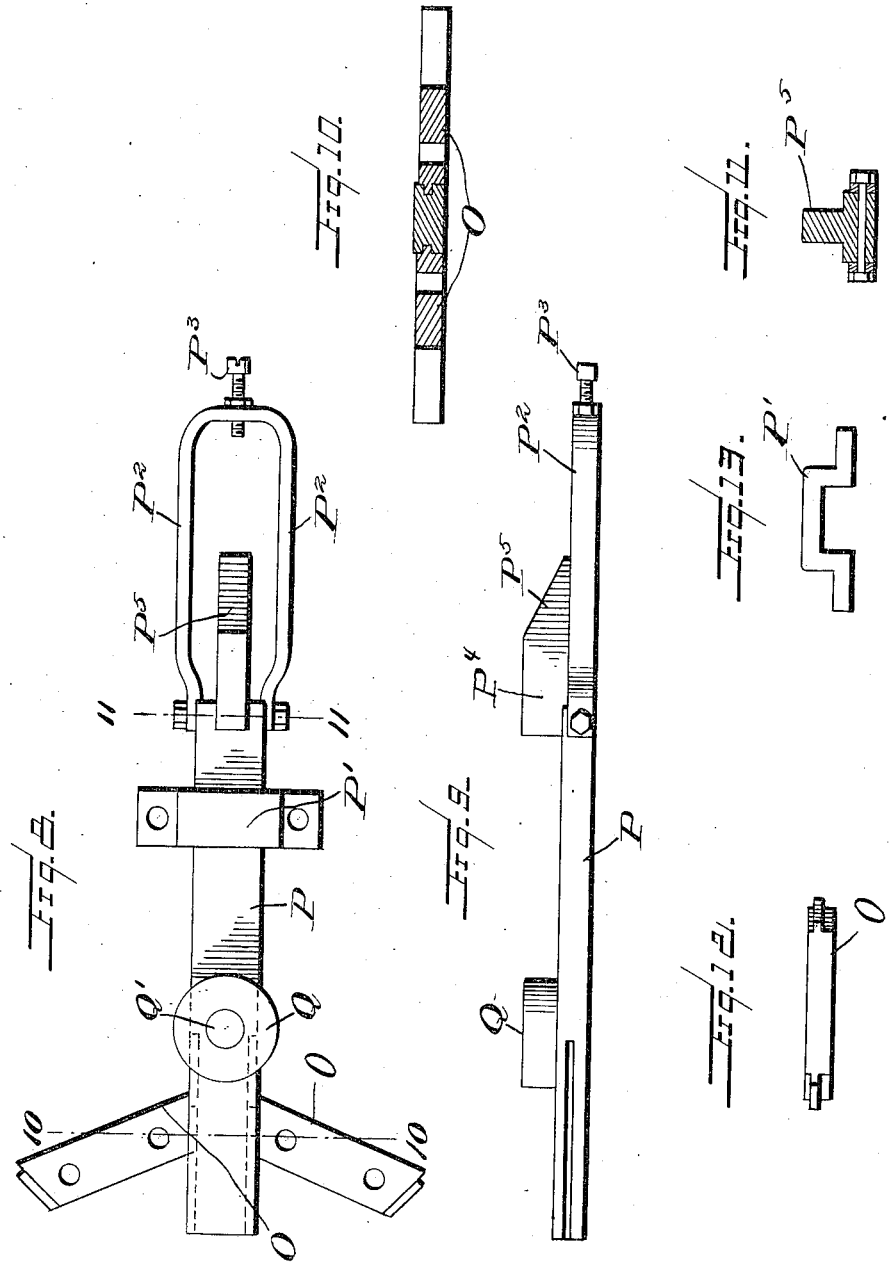

No. 837,605. PATENTED DEC. 4, 1906.
J. M. CARNCROSS.
BOX MAKING MACHINE.
APPLICATION FILED DEC. 12, 1904. RENEWED JUNE 27, 1906.
11 SHEETS—SHEET 9.
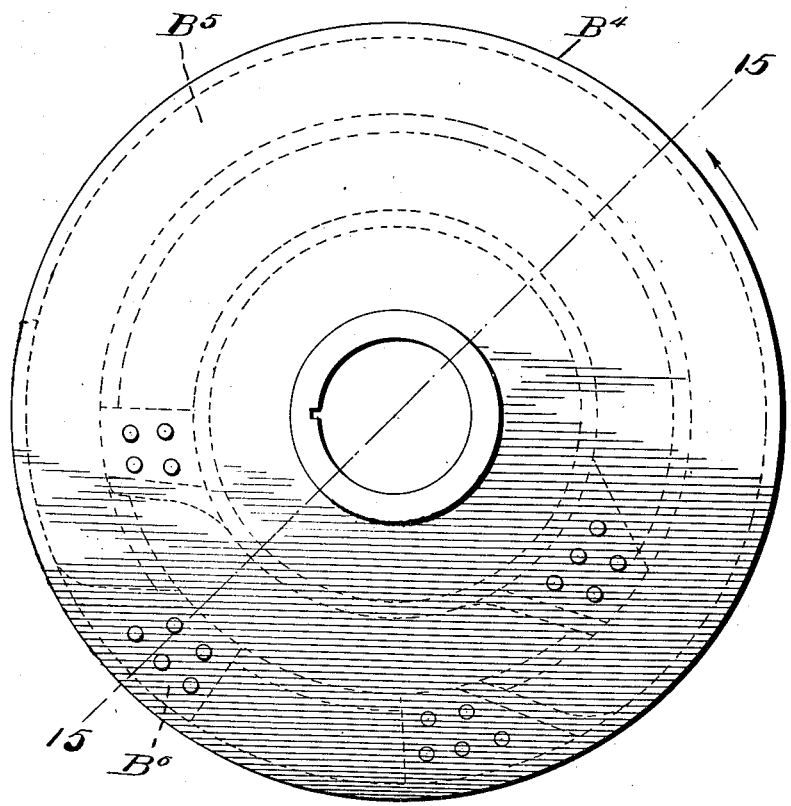
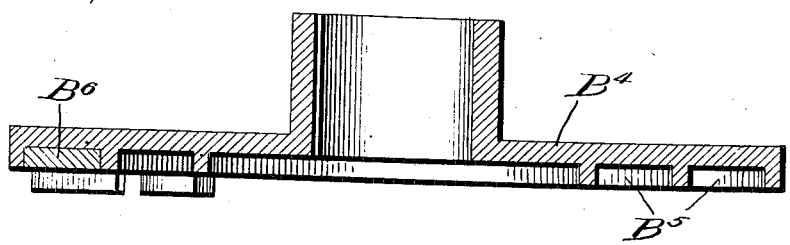
WITNESSES:
INVENTOR
J. M. Carncross
BY
Attorney

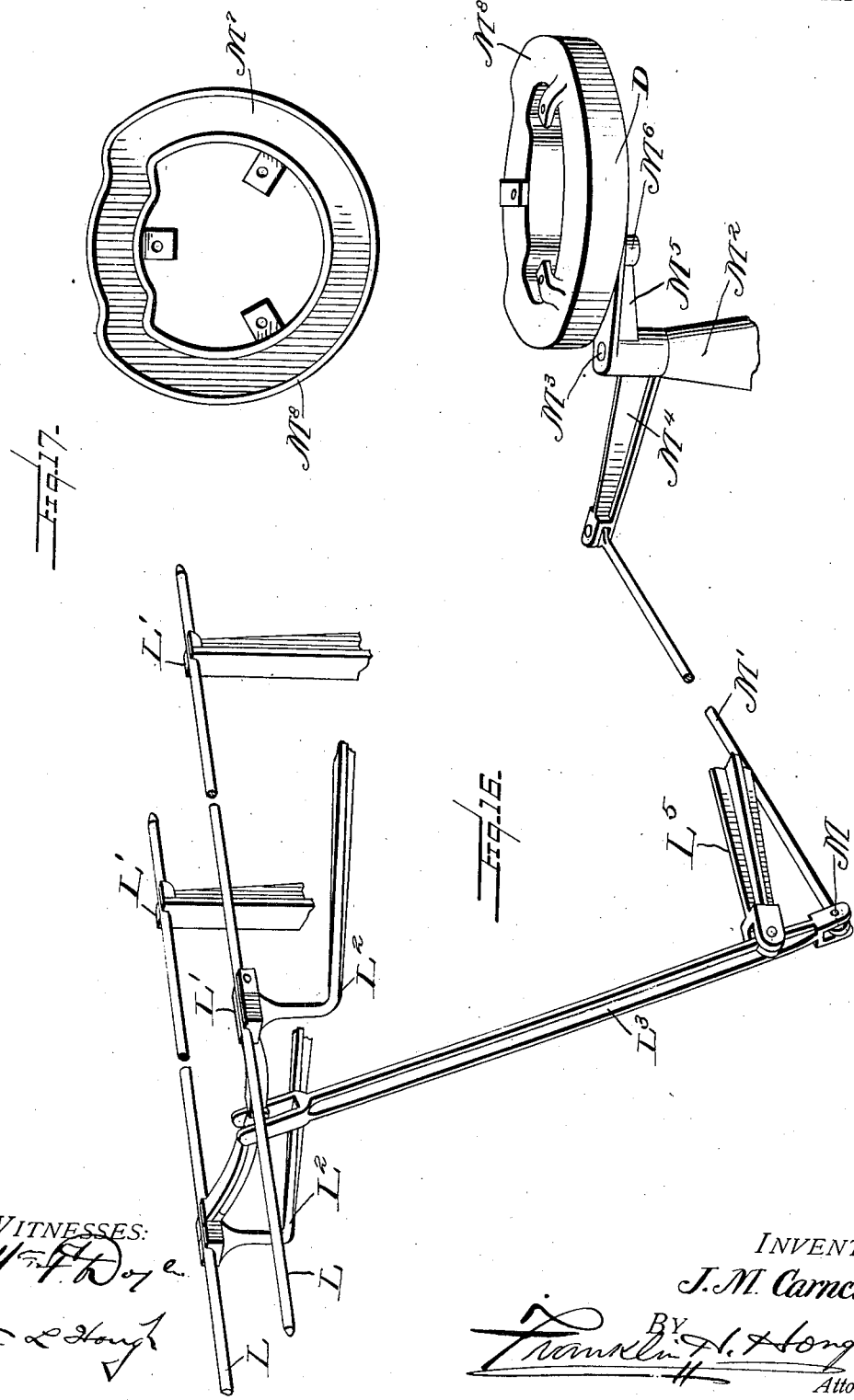

No. 837,605. PATENTED DEC. 4, 1906.
J. M. CARNCROSS.
BOX MAKING MACHINE.
APPLICATION FILED DEC. 12, 1904. RENEWED JUNE 27, 1906.
11 SHEETS—SHEET 11.
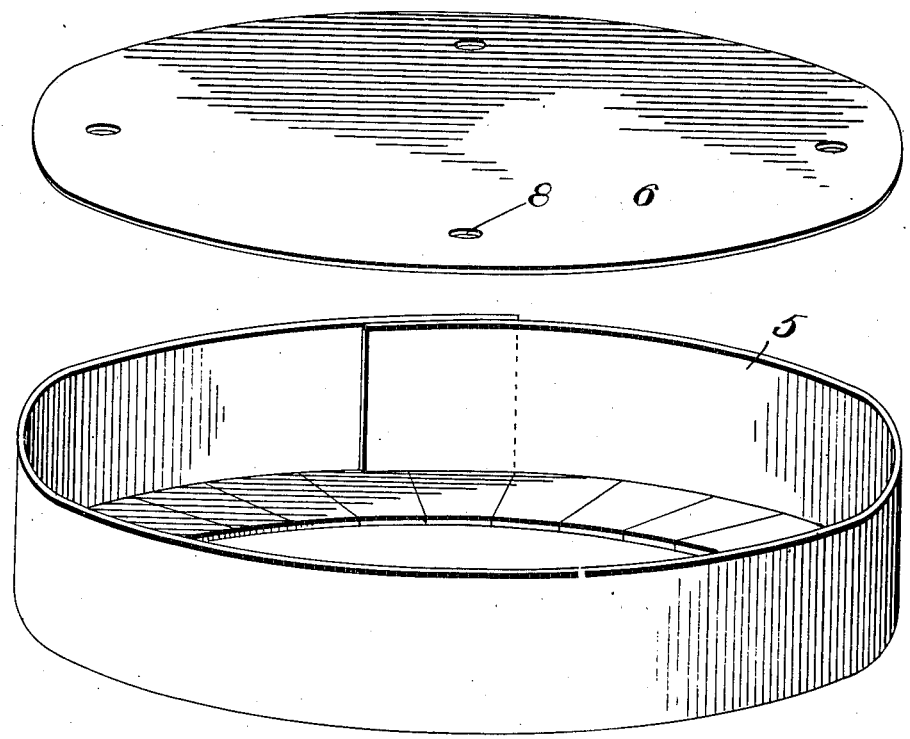
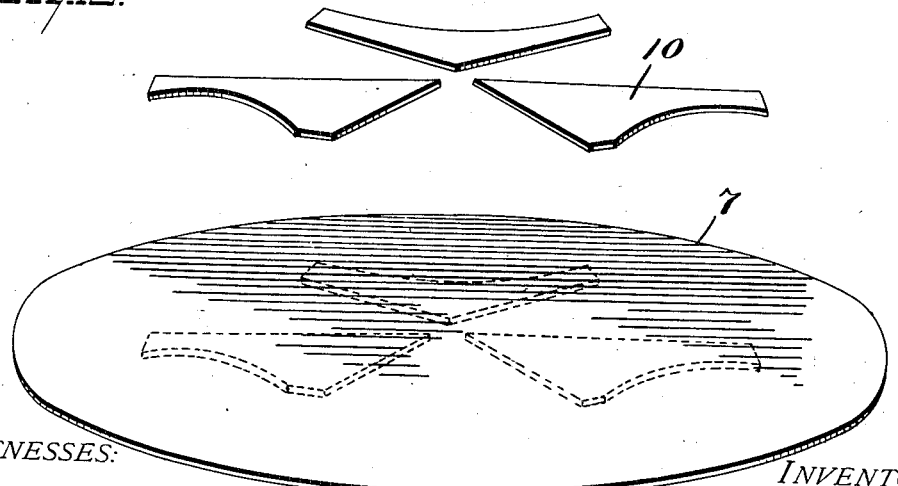
Fig. 18.
WITNESSES:
A. L. Hough
W^m F. Hoyle
INVENTOR
J. M. Carncross.
BY
Franklin N. Hough
Attorney

UNITED STATES PATENT OFFICE.

JACOB M. CARNCROSS, OF TOLEDO, OHIO.

BOX-MAKING MACHINE.

No. 837,605. Specification of Letters Patent. Patented Dec. 4, 1906.

Application filed December 12, 1904. Renewed June 27, 1906. Serial No. 323,593.

*To all whom it may concern:*

Be it known that I, JACOB M. CARNCROSS, a citizen of the United States, residing at Toledo, in the county of Lucas and State of Ohio, have invented certain new and useful Improvements in Box-Making Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in box-making machines; and the object of the invention is to produce a simple and efficient apparatus whereby ventilated covers may be constructed automatically, means being provided to hold the cover while adhesive material upon the parts sets, and in the provision of mechanism for releasing and discharging a completed cover from the apparatus.

The invention consists, further, in various details of construction and in combinations and arrangements of parts, which will be hereinafter fully described and then specifically defined in the appended claims.

The invention is illustrated in the accompanying drawings, which, with the characters of reference marked thereon, form a part of this application, and in which drawings similar characters of reference indicate like parts in the several views, in which—

Figure 1:
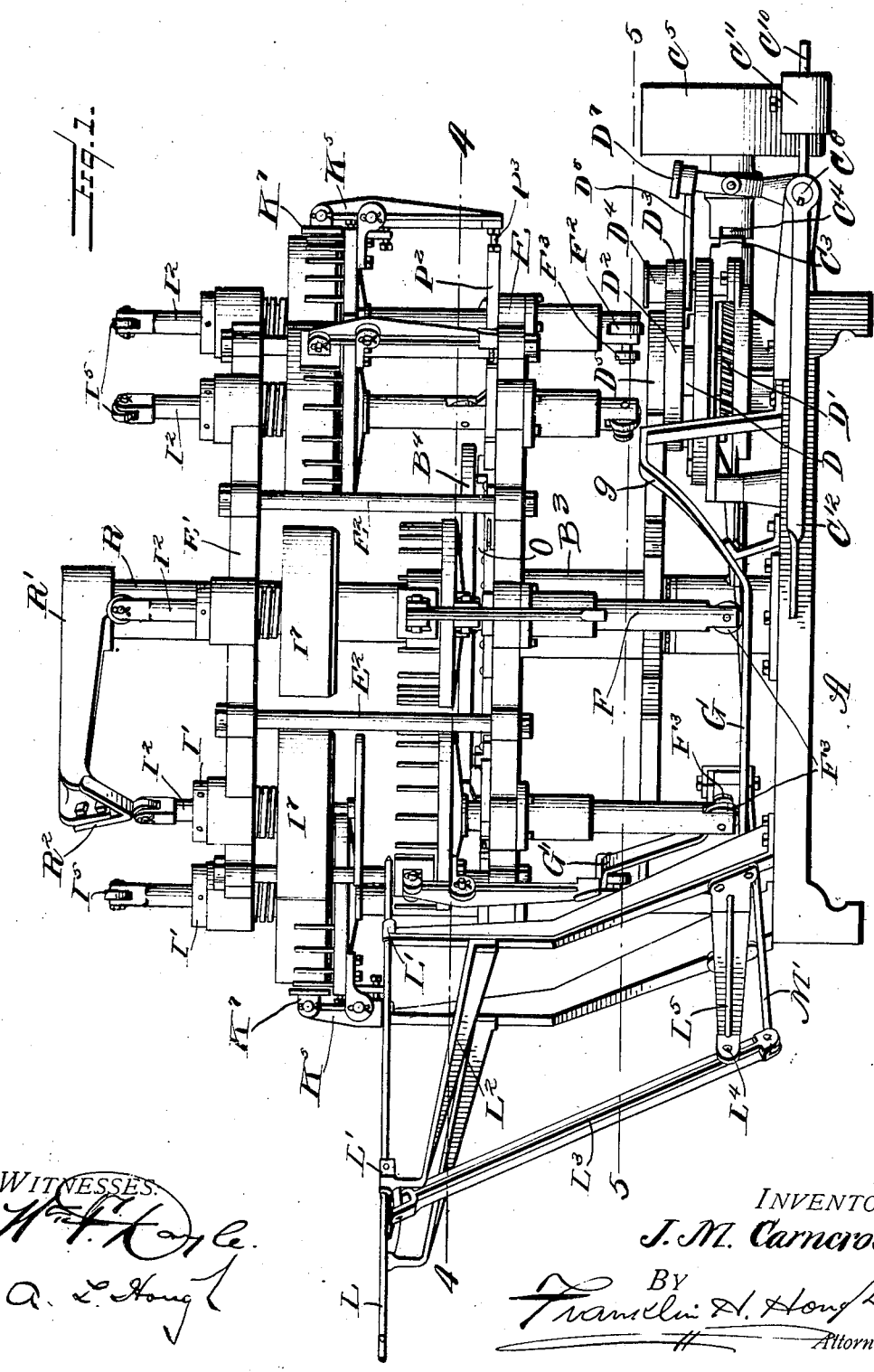
Figure 2:
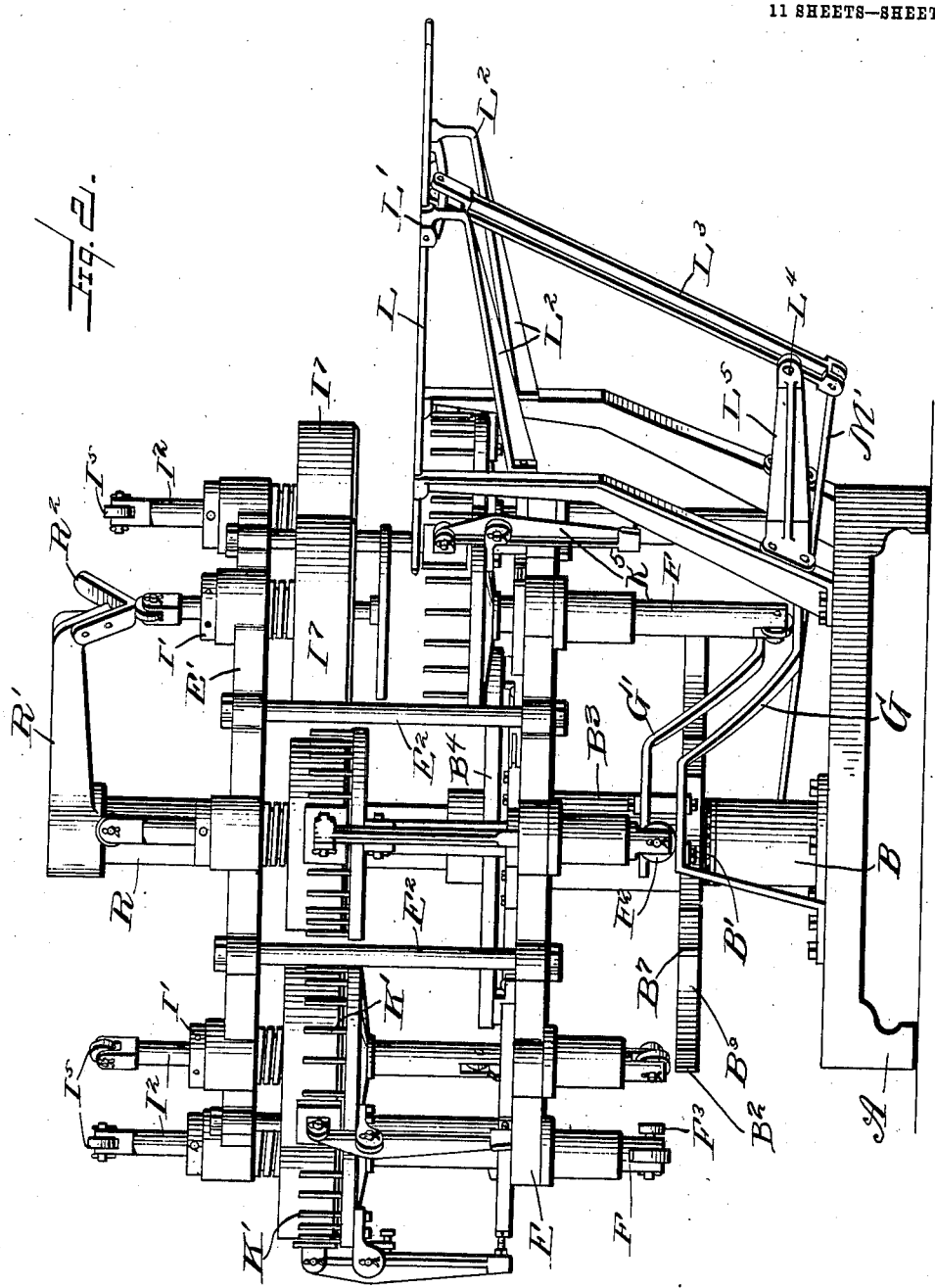
Figure 3:
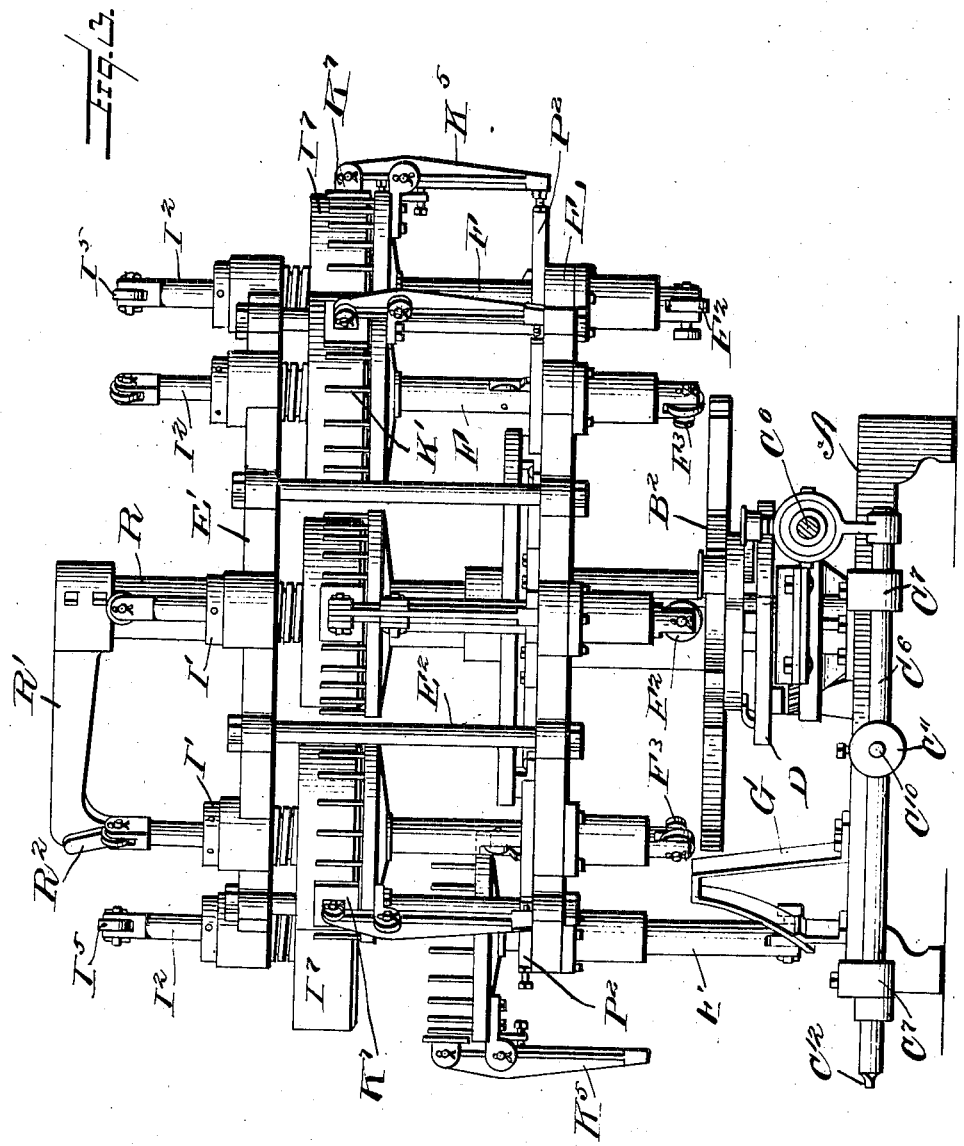
Figure 4:
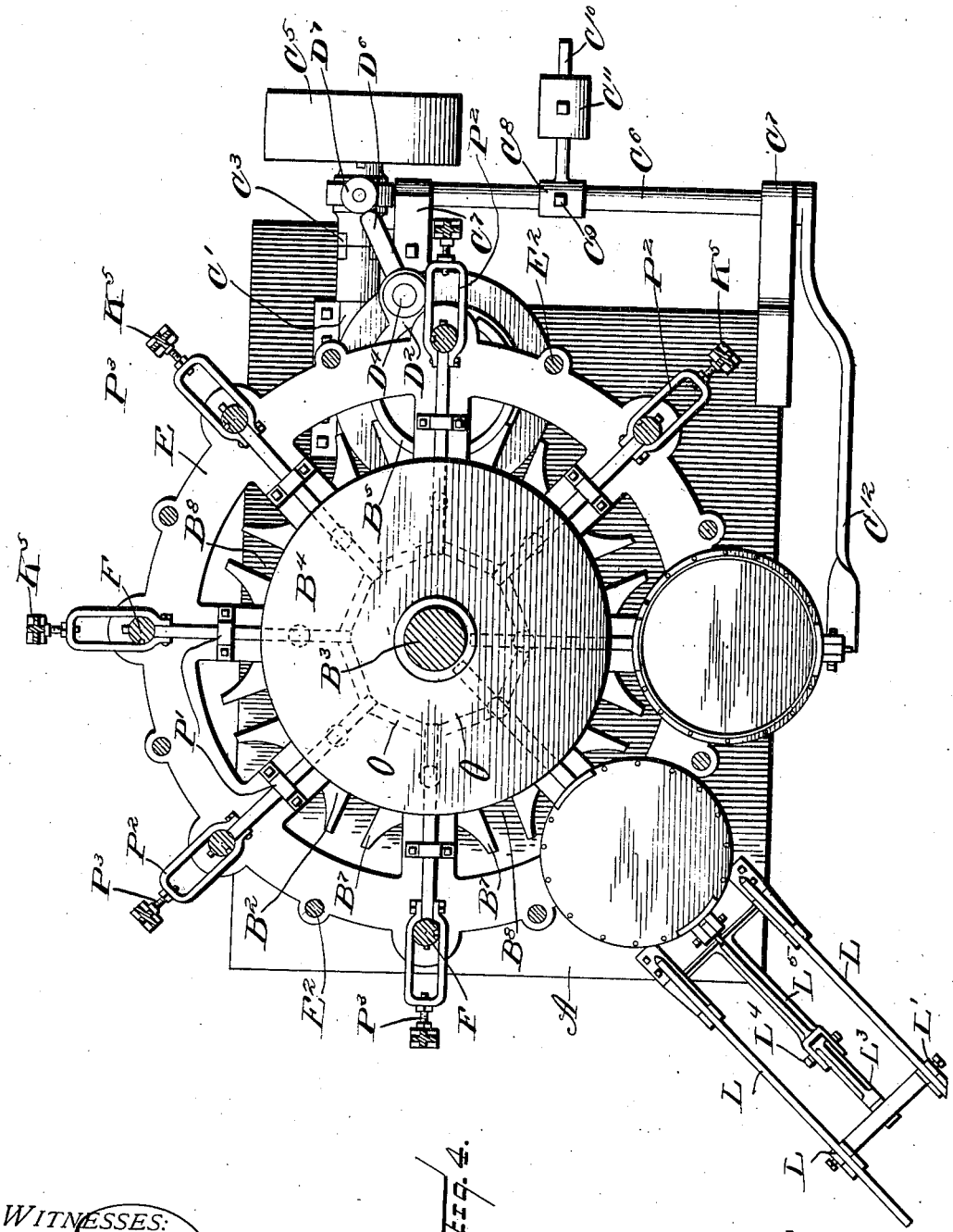
Figure 5:
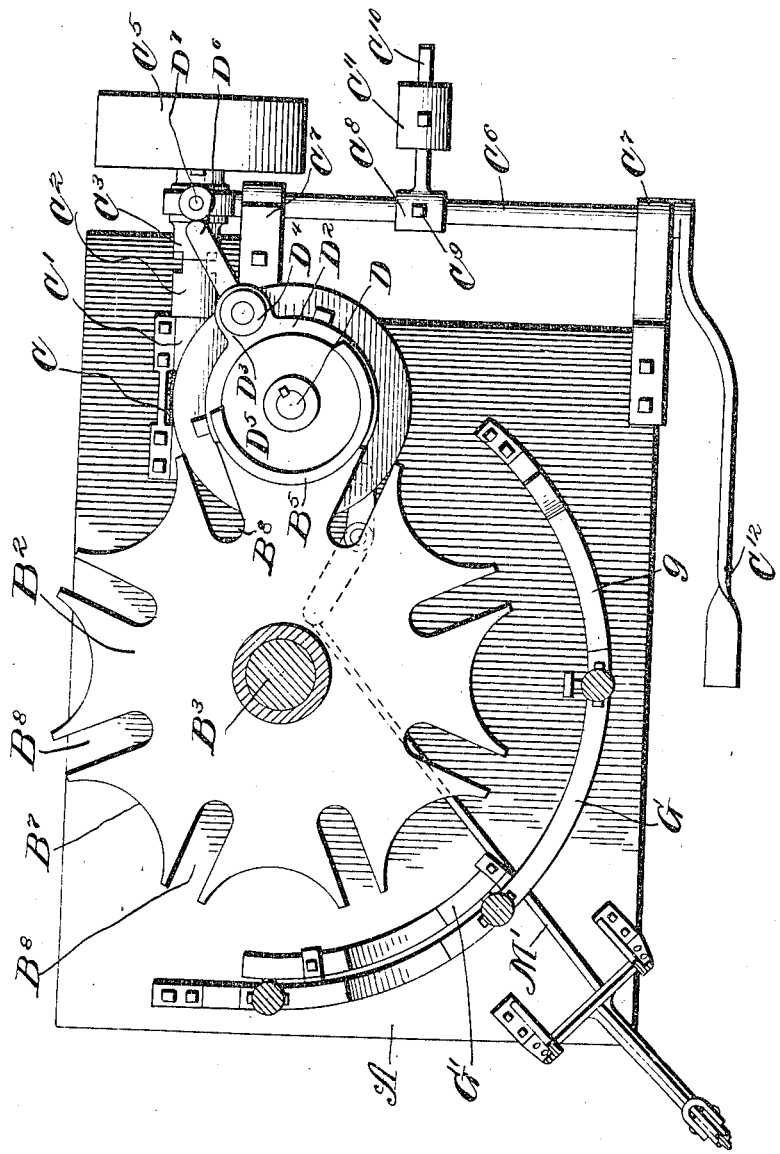
Figure 6:
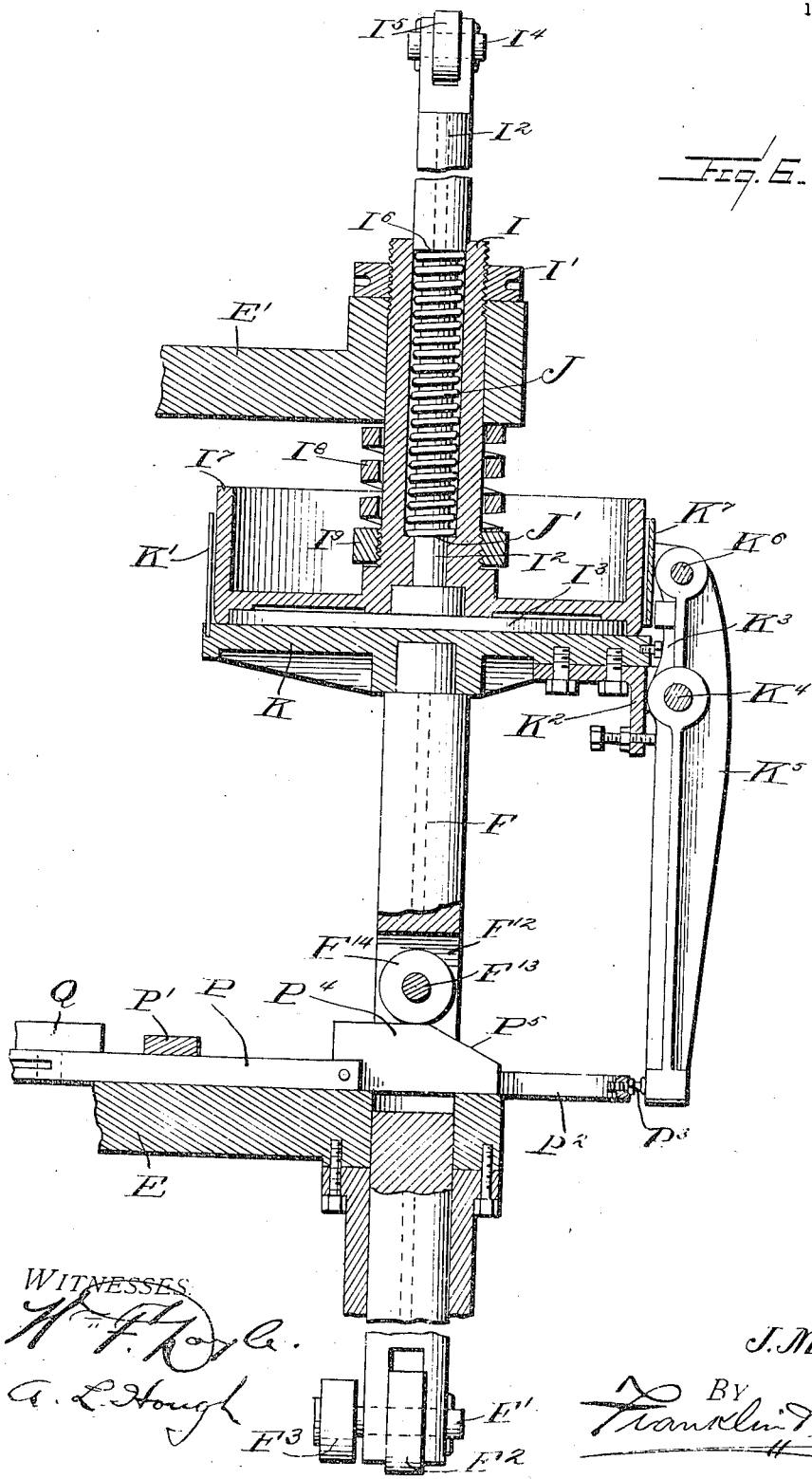

Figure 1 is a view in elevation of one side of the machine. Fig. 2 is a similar view from the opposite side of the machine to that shown in Fig. 1. Fig. 3 is a view in elevation of a rear portion of the machine. Fig. 4 is a sectional view taken on line 4 4 of Fig. 1. Fig. 5 is a sectional view taken on line 5 5 of Fig. 1. Fig. 6 is a vertical sectional view through one of the reciprocating plungers and mechanism for holding the same in a raised position. Fig. 7 is a detail sectional view through the plunger for discharging a cover when completed. Fig. 8 is an enlarged detail view of a part of the mechanism for holding the clamping member against the rib or flange of the cover. Fig. 9 is a side elevation of the detail shown in Fig. 8. Fig. 10 is a cross-sectional view on line 10 10 of Fig. 8. Fig. 11 is a sectional view on line 11 11 of Fig. 8. Fig. 12 is an edge view of the lower end of the view shown in Fig. 8. Fig. 13 is a detail view of the strap through which the shank portion of the reciprocating member shown in Fig. 8 has a longitudinal movement. Fig. 14 is a top plan view of a disk, showing a cam-groove in the bottom thereof and illustrated by dotted lines. Fig. 15 is a sectional view on line 15 15 of Fig. 14. Fig. 16 is a detail perspective view showing the manner of actuating the apparatus for receiving the covers when completed. Fig. 17 is a bottom plan view of the cam member shown in Fig. 16, and Fig. 18 is a view showing the parts of the cover disassembled.

Reference now being had to the details of the drawings by letters and numerals, A designates the base of the apparatus mounted upon suitable legs, and B is a boss secured to said base, and B' designates ball-bearings which are mounted on top of said boss and upon which the rotatable scallopped disk $B^2$ is mounted. Said disk $B^2$ has a central shaft $B^3$ fixed thereto, said shaft rising from the disk and having keyed thereto a cam-wheel $B^4$, an enlarged detail view of said cam-wheel being shown in Figs. 14 and 15, in which in the former figure the cam-groove is indicated by letter $B^5$. Referring to said Fig. 14, it will be observed that the cam-wheel has the adjustable blocks $B^6$ at certain locations with reference to the cam-grooves to vary the shape of the groove, if desired. Said disk $B^2$ has a series of arms $B^7$, with concaved ends, which are spaced apart by grooves $B^8$, which have their inner ends concaved, as shown clearly in Fig. 5 of the drawings. The driving mechanism for rotating said disk $B^2$ comprises a worm-shaft C, mounted in suitable bearings C' and having an end $C^2$, which is adapted to engage with a clutch member $C^3$, having a rotatable and longitudinal play upon a shaft $C^4$, which is driven by means of belted connection wth the pulley $C^5$. (Shown clearly in Figs. 1, 4, and 5.) A rock-shaft $C^6$ is mounted in suitable bearings $C^7$, and a collar $C^8$, fixed to the shaft $C^6$ by means of a set-screw $C^9$, has a finger $C^{10}$ projecting therefrom, carrying an adjustable counterbalance $C^{11}$. A foot-lever $C^{12}$ is fixed to the end of the shaft $C^6$ and is positioned at any suitable location near the machine, whereby the operator may start or stop the apparatus at will. A clutch-throwing yoke $D^7$, having pivotal connection with the clutch member $C^2$, is fixed to work with said shaft $C^6$, whereby the worm-shaft may be thrown into and out of operation by rocking the shaft $C^6$. Keyed to a vertically-mounted shaft D (shown clearly in Fig. 1 of the drawings) is a gear-wheel D', which is in mesh with said worm-shaft C, and $D^2$ designates a disk which is also keyed to the shaft D and has a projecting portion $D^3$, carrying a lug $D^4$, which is adapted at each rotary movement of the disk $D^2$ to engage one of the grooves $B^8$ in the circumference of the disk $B^2$ for the purpose of imparting a partial rotary movement to said disk $B^2$. Rising from the upper surface of the disk $D^2$ is a circular-outlined projection $D^5$, which is adapted to engage the concaved ends of the arms $B^7$, formed in the circumference of the disk $B^2$, as shown clearly in Fig. 5 of the drawings. The circumference of said raised portions $B^5$ conforms to the contour of the concaved portions in the disk $B^2$ and serves to hold the disk steady while the machine is in operation. Secured to the under face of the disk $D^2$ is an arm $D^6$, (shown clearly in Figs. 1 and 5 of the drawings,) which projects beyond the projecting portion $D^3$ of the disk and is adapted at each rotary movement of the disk $D^2$ to contact with said clutch-throwing yoke $D^7$, whereby the machine may be thrown out of gear and the apparatus caused to be at rest while the operator is inserting the parts to form the cover of a box upon one of the heads K, by which mechanism a positive stop is afforded and rendering it possible for the operator to start the machine by pressing the foot-lever $C^{12}$ after the parts forming the cover have been adjusted in place.

E designates a circular-outlined portion of the frame of the apparatus, (shown clearly in Fig. 4 of the drawings,) which forms a guide for the reciprocating posts F, which are shown in section in Fig. 4 of the drawings and in elevation in Figs. 1 to 3, inclusive. E' designates a second circular portion of the frame which supports the upper ends of the vertically-reciprocating posts, and said two circular portions are held together by means of bolts $E^2$, having nuts upon the threaded ends thereof. Referring to Fig. 6 of the drawings, an enlarged detail view of one of said reciprocating posts is illustrated with the means for holding said posts in an elevated position. Each of said posts carries a pin F' in the lower bifurcated end thereof, and $F^2$ designates an antifriction-wheel journaled upon said pin between the arms of the bifurcated end, while a second antifriction-wheel $F^3$ is mounted upon one end of said pin outside the end of the post, as shown clearly in the various views of the drawings. In order to actuate said posts longitudinally and vertically at the proper times, I provide a cam-track G, upon which said antifriction-wheel $F^2$ is adapted to travel. A second cam-track (shown clearly in Fig. 2 of the drawings and designated by letter G') is provided for the purpose of contacting with the antifriction-wheel $F^3$ at a predetermined moment to cause the posts to be positively driven to their lowest positions after the box-cover has been completed. Mounted in apertures in the circular portion E of the frame of the apparatus is a series of sleeves I, each of which is hollow and each being held upon the frame by means of a nut I'. (Shown clearly in Fig. 7 of the drawings.) Mounted in each of said sleeves is a piston-stem $I^2$, having a plunger $I^3$ at the bottom thereof and at the top a pin $I^4$, mounted in a bifurcated end of said stem, and $I^5$ designates an antifriction-wheel mounted upon said pin $I^4$. A spring J is mounted upon each stem $I^2$, one end of the spring bearing against a shoulder J', formed on the inner face of said sleeve, while the other end of the spring bears against a shoulder $I^6$, formed on the circumference of said stem $I^2$. Said sleeve has a cylindrical head $I^7$, and a spring $I^8$ is interposed between a nut $I^9$, mounted upon a threaded portion of the sleeve and the under face of the circular section E' of the frame and provided for the purpose of allowing the head and sleeve to yield slightly under pressure as a head K, which is fixed to the upper end of each of said posts F, is driven upward. The under surface of each of said heads $I^7$ is recessed out, as at $I^{10}$, sufficiently to receive the plunger $I^3$, which latter when seated in said recess will have its lower face flush with the lower edge of the head. Each of said heads K, which are mounted upon the posts F, has a series of pins K' about its periphery and rising from the upper face thereof provided for the purpose of holding the rim of a cover to receive a top or bottom, and fixed to each head K is an angle-iron $K^2$, having a bracket $K^3$ projecting therefrom, which carries a pin $K^4$, upon which a tilting bar $K^5$ is mounted. The upper end of each of said bars $K^5$ carries a pivot-pin $K^6$, on which a clamping-shoe $K^7$ is mounted.

Fixed to the top of the portion E of the frame is a series of plates O, one of said plates being shown clearly in Fig. 8 of the drawings, and said plates are arranged so that their outer edges will form an octagon, and the inner edges of said plates form guides to allow the bars P to have longitudinal reciprocating movements. Straps P' are provided, which serve to hold and guide the bars P in their movements, and which are secured to said disk $B^2$. The outer end of each of said bars P is formed into an elongated loop $P^2$, (shown clearly in Figs. 8 and 9 of the drawings,) and at the outer end of each of said loops is a set-screw $P^3$. Projecting into each of said loops is a block $P^4$, having an inclined edge $P^5$. (Shown clearly in Fig. 6 of the drawings.) Each of the posts F has an elongated slot $F^{12}$, and a pin $F^{13}$ is mounted in the walls of said slot, and an antifriction-wheel $F^{14}$ is journaled upon the pin $F^{13}$ and is designed to contact with said block P⁴ when the bar P is reciprocated. The block P⁴ is provided for the purpose of coöperating with the antifriction-wheel F¹⁴ to support the post with its head in an elevated position, while coöperating with the plunger I³ and the head I⁷ in holding the parts of the cover together in the manner shown in Fig. 6 of the drawings. It will be observed upon reference to Fig. 6 of the drawings that the loop P², which is fastened to the end of the bar P, projects on either side of the post, and the set-screw P³ at the outer end of the loop is adapted to form a stop against which the lower end of the tilting bar K⁵ is adapted to contact for the purpose of holding the shoe K⁷ at the upper end of the bar in clamping relation with the meeting ends of the band or flange of the cover during the rotary movement of the disks and of the circular portions of the frame which rotate therewith. In order to reciprocate the bars P, an antifriction-wheel Q is mounted upon a pin Q′, carried by each bar P, and is adapted to travel in the cam-groove B⁵ in the bottom of the disk B⁴. Said cam-groove is so formed that the bar P will be driven out into the position shown in Fig. 6 of the drawings at a predetermined moment, whereby the shoe K⁷, carried at the upper end of the tilting bar K⁵, may be held against the band of the box-cover during a partial rotary movement of the disk or wheel carrying said post.

Rising from the top of the frame is a post R, having an arm R′ projecting from the end thereof, and at the end of said arm is a V-shaped cam R², which is positioned in the path of the antifriction-wheels I⁵, which are carried at the upper ends of the stems I² and provided for the purpose of causing the stem, with the plunger at the end thereof, to be depressed in the position shown in Fig. 7 of the drawings, whereby a completed top may be ejected from the head I⁷.

The mechanism for receiving the cover when completed and as it is ejected from the head I⁷ comprises the horizontally-reciprocating rack, provided with the two rods L, (shown clearly in Fig. 16 of the drawings,) which rods are guided in the bearings L′ at the upper ends of the braces L². (Shown clearly in Figs. 1 and 2 of the drawings.) A lever L³ is pivotally mounted on a pin L⁴, carried by the arms L⁵, and the upper end of said lever L³ is bifurcated and is connected to a cross-piece of the reciprocating rack, as shown clearly in Figs. 1, 2, and 16 of the drawings. The lower end of said lever L³ is also bifurcated and carries a pin M, which is pivotally connected to a rod M′. Mounted upon a boss M², forming a part of the frame, is a pin M³, forming a pivot for the inner end of the arm M⁴, (shown in Fig. 16 of the drawings,) the outer end of which arm has pivotal connection with the rod M′. A crank-arm M⁵ is integral with the arm M⁴ and carries a lug M⁶, which is adapted to travel in the cam-groove M⁷ in the member M⁸, (shown clearly in Fig. 16 of the drawings,) which is secured to a boss projecting from the under surface of the disk B².

In the disassembled view of the parts of the cover I have illustrated the band (designated by numeral 5) having its lower edge inwardly turned and the two disks 6 and 7, the former of which has ventilating-perforations 8 and the spacing-blocks 10, which are placed upon the disk 7 in the positions illustrated in dotted lines, whereby there may be a space between the two disks when they are fastened together in the completed cover to allow a free circulation of air for the purpose of ventilation.

The operation of my machine is as follows: The disk 7, which forms the outer portion of the cover of the box, is placed upon the head K by the operator, the blocks 10, coated with an adhesive material upon both faces thereof, first having been placed upon the upper surface of said disk, after which the band 5, which has been previously turned into circular form, as illustrated in Fig. 18 of the drawings, and to the under flanged surface of which has been applied an adhesive material, is placed upon the disk 7, and afterward the inner disk 6 is placed upon the upper surface of the flange of the band 5, and by means of suitable adhesive material upon the upper surfaces of the blocks 10 the parts are in readiness to be compressed together by the mechanism forming the subject-matter of the present invention. The parts being thus assembled, the machine is put in operation by the operator depressing the lever C¹², which actuates the clutch mechanism, and the disks carrying the posts, each of which supports the parts to form a cover, begin to rotate, and as an antifriction-wheel F², carried at the lower end of one of the posts F, comes in contact with the inclined portion $g$ of the track G the post will be raised to the position shown in Fig. 7 of the drawings, and in which position the head K will cause the parts of the cover to be held under heavy pressure against the under surface of the plunger I³, and as the plunger and the sleeve carrying the same are allowed to yield slightly the jar incident to the upward throw of the post carrying the parts of the cover will be taken up by the spring I⁸. As a post F reaches its highest position, which is illustrated at the right of Fig. 1 and in the detail view of Fig. 6, the bar P, which passes through the particular post which has been raised, will be thrown into the position shown in Fig. 6 of the drawings, and the set-screw P³ at the end of the loop of said bar will contact with the lower end of the tilting bar K⁵ and cause the shoe at the upper end of said bar to clamp and hold the meeting and overlapping ends of the band of the cover securely together. The cover, with the plunger and head bearing, respectively, against the upper surface of the disks 6 and 7 and the shoe bearing against the overlapping ends of the bands, is held in the position illustrated in Fig. 6 of the drawings while the circular portions of the frame carrying the posts make nearly complete rotary movements. The movements of the posts carrying the box-covers are sufficiently slow to allow the parts to adhere sufficiently by the time they are ready to be discharged after the machine has made a single cycle. As one of the antifriction-wheels I⁵ comes in contact with the stationary cam R² the stem I² will cause the plunger I³ to be depressed into the position shown in Fig. 7 of the drawings, which will cause the cover to be ejected from the machine. Immediately before the plunger is depressed the antifriction-wheel F³ as it approaches the cam-track G' will contact with the under edge thereof and cause the post to be lowered into the position shown at the left of Fig. 1. Momentarily after the post has been depressed to its lowest position the cam member M⁸ in its rotary movement will cause the rods L to be driven forward underneath the cover, which is held suspended by the plunger and head I⁷ of said sleeve in readiness to receive the cover as it is ejected. The moment the cover is ejected the cam making a further rotary movement will cause the rack of which the bars L form a portion to be thrown outward with the cover thereon, and the head of the post from which the completed cover has been removed is in readiness to receive the parts to form a new top and the operation is repeated. By the provision of the arm D⁶, which rotates with the disk D², it will be observed that at each revolution of said disk said arm will contact with the clutch-throwing post D⁷ and the machine will be stopped and in readiness to be started when the parts to form a cover are placed upon the head K by the simple compression of the foot-lever C¹², and the apparatus is under the ready control of the operator at all times.

While I have shown a particular form of apparatus illustrating my machine for making tops for boxes, it will be understood that I may vary the details of the same in various respects, if desired, without departing from the spirit of the invention.

Having thus fully described my invention, what I claim as new, and desire to secure by Letters Patent, is—

1. A box-cover-making machine comprising a rotatable carrier, formers mounted thereon, a cover-releasing member connected with each former, means for depressing said member, and mechanism for imparting an intermittent movement to said carrier, as set forth.

2. A box-cover-making machine comprising a rotatable carrier, yielding formers mounted thereon, a cover-releasing member connected with each former, means for depressing said members, and mechanism for imparting an intermittent movement to the carrier, as set forth.

3. A box-cover-making machine comprising a rotatable carrier, yielding formers mounted thereon, vertically-reciprocating cover-supporters designed to hold the parts of a cover and raise the same against said former, a releasing member mounted within each former, and means for depressing said members, as set forth.

4. A box-cover-making machine comprising a rotatable carrier, a series of spring-pressed formers mounted upon said carrier, a releasing member carried within each former, cover-supporters, means for raising the parts of a cover against said former and releasing member, and means for actuating the apparatus, as set forth.

5. A box-cover-making machine comprising a rotatable carrier, series of yielding formers mounted thereon, a releasing member within each former, a cover-supporter and means for raising the same to bring the parts of a cover against the former, and a fixed object positioned in the path of the upper ends of said releasing members whereby the latter may be depressed to release the cover from the former, as set forth.

6. A box-cover-making machine comprising a rotatable carrier, yielding formers mounted thereon, a spring-pressed releasing member carried by each of said formers, vertically-reciprocating cover-supporters and means for raising the parts of a cover thereon against said former and releasing member, and a fixed object positioned in the paths of said members and designed to depress said releasing member, as set forth.

7. A box-cover-making machine comprising a rotatable carrier, yielding formers mounted thereon, a spring-pressed releasing member carried by each of said formers, vertically-reciprocating cover-supporters and means for raising the parts of a cover thereon against said former and releasing member, mechanism for holding the rim of a cover against the former while the cover-supporters are held in elevated positions, and a fixed object positioned in the paths of said members and designed for depressing said releasing member, as set forth.

8. A box-cover-making machine comprising a rotatable carrier, yielding formers mounted thereon, a spring-pressed releasing member carried within each former, vertically-reciprocating cover-supporters, means carried by each of said supporters for clamping the rim of a box against the circumference of a former while in an elevated position, and means for raising said supporters and for actuating said clamping means, as set forth.

9. A box-cover-making machine comprising a rotatable carrier, yielding formers mounted thereon having shank portions which are hollow, a spring-pressed post mounted in the hollow shank portion of each former, a releasing-disk fixed to the lower end of each of said posts, vertically-reciprocating cover-supporters designed to raise the parts of a cover against said former and releasing member, means for raising said supporters, and mechanism for depressing said releasing member, as set forth.

10. A box-cover-making machine comprising a rotatable carrier, yielding formers mounted thereon having shank portions which are hollow, a spring-pressed post mounted in the hollow shank portion of each former, a releasing-disk fixed to the lower end of each of said posts, vertically-reciprocating cover-supporters designed to raise the parts of a cover against said former and releasing member, means for raising said supporters, a fixed object against which said post is adapted to contact to cause the releasing member to be depressed to release the cover from the former, as set forth.

11. A box-cover-making machine comprising a rotatable carrier, yielding formers mounted thereon having shank portions which are hollow, a spring-pressed post mounted in the hollow shank portion of each former, a releasing-disk fixed to the lower end of each of said posts, vertically-reciprocating cover-supporters designed to raise the parts of a cover against said former and releasing member, means for raising said supporters, a fixed object against which said post is adapted to contact to cause the releasing member to be depressed to release the cover from the former, and means carried by each supporter to hold the rim of a cover against the circumference of a former when said supporter is in an elevated position, as set forth.

12. A box-cover-making machine comprising a rotatable carrier, yielding formers mounted upon said carrier and having hollow shank portions, a spring-pressed post mounted in each of said hollow shank portions, a disk fixed to the lower end of each of said posts and adapted to normally seat in a recess in the bottom of said former, a vertically-reciprocating cover-supporter, means for raising said supporter against said releasing member and former, clamping means for holding the rim of a cover against the circumference of said former when in an elevated position, means for depressing said releasing member, as set forth.

13. A box-cover-making machine comprising a rotatable carrier, yielding formers mounted thereon, a spring-pressed post carried by each of said formers, a releasing-disk fixed to the lower end of each post, cover-supporters, a series of pins rising from each of said supporters adjacent to the circumference thereof, means for raising said supporter against a former, and means carried by the supporter for holding the rim of a cover against the circumference of the former when the supporter is in an elevated position, as set forth.

14. A box-cover-making machine comprising a rotatable carrier, series of yielding formers mounted thereon, a spring-pressed releasing member carried by each former, a series of cover-supporting heads and posts supporting the same, means for elevating said posts, a horizontally-reciprocating cam designed to hold said post elevated, means carried by said head for clamping the rim of a cover to the circumference of said former when the post is in a raised position, and means for depressing said releasing member, as set forth.

15. A box-cover-making machine comprising a rotatable carrier, series of yielding formers mounted thereon, a spring-pressed releasing member carried by each former, a series of cover-supporting heads and posts supporting the same, means for elevating said posts, a horizontally-reciprocating cam designed to hold said post elevated, means carried by said head for clamping the rim of a cover to the circumference of said former when the post is in a raised position, adjustable mechanism for operating said clamping means, and means for depressing the releasing member, as set forth.

16. A box-cover-making machine comprising a rotatable carrier, yielding formers mounted thereon, a spring-pressed releasing member mounted within each former, vertically-reciprocating cover supporters and means for raising said supporters against the former and releasing member, a pivotal lever mounted upon each of said supporters, a clamping-plate mounted upon each of said levers, an adjusting-screw carried by each supporter, a horizontally-reciprocating yoke, means for operating the same, an adjusting-screw carried by said yoke and adapted to tilt said lever whereby the rim of a cover may be held against the circumference of said former when the cover-supporter is in a raised position, and means for depressing said releasing member, as set forth.

17. A box-cover-making machine comprising a rotatable carrier, yielding formers mounted thereon, a spring-pressed releasing member mounted within each former, a rotatable disk with cam-groove therein moving with the carrier, a longitudinally-movable bar, an antifriction-wheel carried thereby and traveling in the cam-groove of said disk, cover-supporters, posts upon which the latter are mounted, mechanism for elevating said posts, means carried by said bars for holding said posts elevated, mechanism mounted upon each supporter for holding the rim of a cover against the circumference of a former while the supporter is in a raised position, and means for depressing said releasing member whereby a box-cover may be separated from a former, as set forth.

18. A box-cover-making machine comprising a rotatable carrier, yielding formers mounted thereon, a spring-pressed releasing member mounted within each former, a rotatable disk with cam-groove therein moving with the carrier, a longitudinally-movable bar, an antifriction-wheel carried thereby and traveling in the cam-groove of said disk, cover-supporters, posts upon which the latter are mounted, mechanism for elevating said posts, means carried by said bar for holding said posts elevated, a yoke carried by said bar, a set-screw mounted in said yoke, a pivotal lever mounted upon each of said supporters, a clamping-plate mounted upon said lever, the lower portion of said lever adapted to be actuated by said set-screw whereby the rim of a cover may be held against the circumference of a former while the supporter is in a raised position, and means for depressing said releasing member whereby the cover may be separated from the former, as set forth.

19. A box-cover-making machine comprising a rotatable carrier, formers mounted thereon, vertically-movable cover-supporting members, a pivotal lever mounted upon each of said members, a clamping-plate fixed to each lever, a longitudinally-movable bar, and means for driving the same against said lever to throw said clamping-plate against the former, as set forth.

20. A box-cover-making machine comprising a rotatable carrier, yielding formers mounted thereon, a spring-pressed releasing-disk mounted within each former, a vertically-reciprocating cover-supporter, a pivotal lever mounted upon each of said supporters, a clamping-plate fixed to each lever, a longitudinally-movable bar and means for throwing the same against said lever to cause the latter to tilt whereby the plate carried thereby may hold the rim of a cover against the circumference of said former, and means for depressing said releasing member, as set forth.

21. A box-cover-making machine comprising a rotatable carrier, formers mounted thereon, a series of vertically-movable cover-supporting members, a pivotal lever mounted upon each of said members, a clamping-plate fixed to each of said levers, horizontally-movable bars, an adjusting-screw carried thereby and adapted to tilt said levers to throw the clamping-plates against the circumferences of the formers, and means for actuating said bars, as set orth.

22. A box-cover-making machine comprising a rotatable carrier, formers mounted thereon, a series of box-cover-supporting members, a pivotal lever mounted upon each of said members, a clamping-plate secured to each lever, means for raising said members, a longitudinally-movable bar adapted to hold each of said members in a raised position, a disk having a cam-groove therein, an antifriction-wheel carried by said bar traveling in said groove, and means carried by said bar for tilting said lever, whereby said clamping-plate may be held against the circumference of the former when a supporting member is in a raised position, as set forth.

23. A box-cover-making machine comprising a rotatable carrier, a series of formers mounted thereon, cover-supporting members movable with the carrier, a lever pivoted to each of said members, a clamping-plate fixed to each lever, means carried by said member for adjusting the throw of said lever, and mechanism for tilting the lever, as set forth.

24. A box-cover-making machine comprising a rotatable carrier, a series of formers mounted thereon, cover-supporting members movable with the carrier, a lever pivoted to each of said members, a clamping-plate fixed to each lever, means carried by said member for adjusting the throw of said lever, and mechanism for raising said member and tilting said lever, as set forth.

25. A box-cover-making machine comprising a rotatable carrier, formers mounted thereon, a series of cover-supporting members moving with the carrier, a lever pivoted to each of said members, a clamping-plate pivoted to each lever, a bracket secured to each member, an adjusting-screw carried by said bracket and adapted to limit the throw of said lever, and mechanism for raising said member and tilting said lever, as set forth.

26. A box-cover-making machine comprising a rotatable carrier, formers mounted thereon, a series of cover-supporting members movable with the carrier, a pivotal lever mounted upon each of said members, a clamping-plate secured to each lever, a longitudinally-movable bar adapted to tilt said lever, a cam movable with the carrier and adapted to actuate said bar, as set forth.

27. A box-cover-making machine comprising a rotatable carrier, formers mounted thereon, a series of box-cover-supporting members, a pivotal lever mounted upon each member, a clamping-plate fixed to each lever, means for raising said cover-supporting member, a longitudinally-movable bar, a cam-block movable therewith and adapted to hold said member in a raised position, said bars designed to tilt the levers whereby the clamping-plates may be held against the circumferences of formers, as set forth.

28. A box-cover-making machine comprising a rotatable carrier, formers mounted thereon, a series of box-cover-supporting members, posts supporting said members, clamping means carried by each of said members, a cam-track, an antifriction-wheel carried by said posts and adapted to ride upon said track whereby the box-cover-holding member may be raised against a former, and means for actuating said clamping mechanism, as set forth.

29. A box-cover-making machine comprising a rotatable carrier, formers mounted thereon, cover-supporting members movable with the carrier, a post supporting each of said members, an antifriction-wheel mounted at the lower end of each post, a cam-track on which said wheel travels and adapted to raise said member against a former, a horizontally-movable cam-block adapted to hold the post in a raised position, a pivotal lever, a clamping-plate carried by said lever and means for tilting said lever whereby said clamping-plate may be held against the circumference of a former, as set forth.

30. A box-cover-making machine comprising a rotatable carrier, formers mounted thereon, a series of box-cover-supporting members, a lever pivotally supported on each of said members, a slotted post secured to each of said members, an antifriction-wheel at the lower end of each post, an antifriction-wheel mounted in the slot in each post intermediate its ends, an inclined track against which the antifriction-wheel at the bottom of said post is adapted to contact, clamping means carried by each of said levers, a horizontally-movable bar, a cam-block mounted thereon and adapted to move through said slot and contact with the antifriction-wheel therein for holding said member in a raised position, and means for tilting said lever, as set forth.

31. A box-cover-making machine comprising a rotatable carrier, formers mounted thereon, a series of box-cover-supporting members, a slotted post secured to each member, an antifriction-wheel journaled at the bottom of each post, a cam-track on which said wheel travels, a pivotal lever mounted upon each member, a clamping-plate fixed to each lever, an antifriction-wheel mounted in each slot in said posts, a horizontally-movable bar, a cam-block thereon adapted to engage said wheel in said slot, a loop secured to the end of said bar, and an adjusting-screw carried by said loop and adapted to contact with said lever, as set forth.

32. A box-cover-making machine comprising a rotatable carrier, formers mounted thereon, a series of box-cover-supporting members movable with the carrier, a slotted post secured to each of said members, a lever pivoted to each member, a clamping-plate fixed to each lever, a post supporting each member, an antifriction-wheel at the bottom of each post, a cam-track on which said wheel travels, a horizontally-movable bar, a cam-plate secured to said bar, an antifriction-wheel mounted in each slot in said posts and against which said cam-block is adapted to engage, a loop secured to said bar and surrounding said post, and an adjusting-screw carried by said loop and adapted to contact with said pivotal lever, as set forth.

33. A box-cover-making machine comprising a rotatable carrier, formers mounted upon said carrier, a series of box-cover-supporting members movable with the carrier, a post supporting each of said members, an antifriction-wheel mounted upon each post, a cam-track on which said antifriction-wheel travels, a lever pivoted to each member, a clamping-plate fixed to each lever, a rotatable cam-disk, a longitudinally-movable bar actuated by said cam-disk and adapted to hold one of said members in a raised position and to throw said clamping-plate against a former, as set forth.

34. A box-cover-making machine comprising a rotatable carrier, formers mounted thereon, box-cover-holding members, a post secured to each member, a guide therefor, a lever pivoted to each member, a clamping-plate fixed to each lever, an antifriction-wheel carried by each post, a cam-track on which said antifriction-wheel travels, a disk rotating with the carrier and having cam-grooves therein, a horizontally-reciprocating bar, a guide therefor, an antifriction-wheel carried by said bar and traveling in the cam-grooves of said disk, said bar designed to hold said member in a raised position and the clamping mechanism thereon against a former, as set forth.

35. A box-cover-making machine comprising a rotatable carrier, formers mounted thereon, a series of cover-supporting members, a post supporting each of said members, clamping means carried by each member, means for raising said post and mechanism for holding the same in a raised position, an antifriction-wheel mounted upon the side of each post, and a cam-track adapted to engage said antifriction-wheel to lower the cover-supporting member, as set forth.

36. A box-cover-making machine comprising a rotatable carrier, formers mounted thereon, box-cover-supporting members, clamping means carried thereby, means for raising and holding said members against the former, mechanism for separating a completed cover from a former, and means actuated by the rotatable carrier for receiving and withdrawing a completed cover, as set forth.

37. A box-cover-making machine comprising a rotatable carrier, formers mounted thereon, box-cover-supporting members, clamping means carried thereby, means for raising and holding said members against the former, mechanism for separating a completed cover from a former, a horizontally-movable rack adapted to receive a cover as it is separated from a former, and means actuated by the carrier for operating said rack, as set forth.

38. A box-cover-making machine comprising a rotatable carrier, formers mounted thereon, box-cover-supporting members, clamping means carried thereby, means for raising and holding said members against the former, mechanism for separating a completed cover from a former, a horizontally-movable rack, a pivotal lever for actuating said rack, a cam, and connections between the same and said pivotal lever for actuating the rack, as set forth.

39. A box-cover-making machine comprising a rotatable carrier, formers mounted thereon, box-cover-supporting members, clamping means carried thereby, means for raising and holding said members against the former, mechanism for separating a completed cover from a former, a horizontally-movable rack, a tilting lever for actuating the same, a cam rotating with the carrier, a pivotal crank member, one arm of which is connected to said tilting lever, a lug carried by the other arm of said lever and adapted to be actuated by said cam member, whereby the rack may be actuated at a predetermined moment, as set forth.

40. A box-cover-making machine comprising a rotatable carrier, formers mounted thereon, cover-supporting members, means for holding the parts of a cover upon said members, mechanism for raising the latter to force the parts of a cover against said former, means carried by the members for clamping the rim of the cover against the former, a rotatable disk, means moving therewith for actuating the carrier, an arm secured to said disk and projecting beyond the periphery thereof, and clutch mechanism adapted to be actuated by said arm, whereby the mechanism may be thrown out of gear, as set forth.

In testimony whereof I hereunto affix my signature in presence of two witnesses.

JACOB M. CARNCROSS.

Witnesses:
MARTIN V. BOYER,
W. DERBY.